(12) United States Patent
Fuse

(10) Patent No.: US 8,581,950 B2
(45) Date of Patent: Nov. 12, 2013

(54) IMAGE FORMING APPARATUS AND METHOD OF THE SAME

(75) Inventor: Hiroyuki Fuse, Shizuoka-ken (JP)

(73) Assignees: Kabushiki Kaisha Toshiba, Tokyo (JP); Toshiba TEC Kabushiki Kaisha, Tokyo (JP)

(*) Notice: Subject to any disclaimer, the term of this patent is extended or adjusted under 35 U.S.C. 154(b) by 97 days.

(21) Appl. No.: 13/236,593

(22) Filed: Sep. 19, 2011

(65) Prior Publication Data
US 2012/0069126 A1    Mar. 22, 2012

Related U.S. Application Data

(60) Provisional application No. 61/384,674, filed on Sep. 20, 2010.

(51) Int. Cl.
  *B41J 2/435* (2006.01)
  *B41J 2/47* (2006.01)

(52) U.S. Cl.
  USPC ............................................ 347/235; 347/250

(58) Field of Classification Search
  USPC ..................... 347/229, 234, 235, 248–250
  See application file for complete search history.

(56) References Cited

U.S. PATENT DOCUMENTS 7,489,328 B2 * 2/2009 Akamatsu ...................... 347/235
7,567,264 B2 * 7/2009 Izumiya ......................... 347/116

FOREIGN PATENT DOCUMENTS

| JP | 8-324022 A | 12/1996 |
| JP | 9-066630 A | 3/1997 |
| JP | 2005-208379 A | 8/2005 |

* cited by examiner

*Primary Examiner* — Hai C Pham
(74) *Attorney, Agent, or Firm* — Patterson & Sheridan, L.L.P.

(57) ABSTRACT

According to one embodiment, a laser controller generates a signal which corresponds to an output signal of a laser beam detection sensor before detecting an abnormality, in which the abnormality is detected, in a pseudo manner, on the basis of an output signal of a laser beam detection sensor in which the abnormality is not detected. In addition, the laser controller controls a laser unit which corresponds to the laser beam detection sensor in which the abnormality is detected, according to the generated signal.

16 Claims, 7 Drawing Sheets

IMAGE FORMING APPARATUS AND METHOD OF THE SAME

CROSS-REFERENCE TO RELATED APPLICATIONS

This application is based upon and claims the benefit of priority from U.S. provisional application No. 61/384,674, filed on Sep. 20, 2010, the entire contents of which are incorporated herein by reference.

FIELD

Embodiments described herein relate generally to an image forming apparatus and a method of the same

BACKGROUND

An image forming apparatus includes a plurality of photoconductive drums for forming color images and a plurality of laser beam units which emit a laser beam, and forms a latent image on each of the photoconductive drums by performing the main scanning and the sub scanning on the photoconductive drums, using the laser beam emitted from these laser units. In addition the image forming apparatus develops the latent image formed on each of the photoconductive drums, and prints the image on an image forming medium, for example, on a paper sheet.

The image forming apparatus has a plurality of laser beam detection sensors. These laser beam detection sensors detect a laser beam which is emitted from each of the laser units, as the reference position of the main scanning with respect to each of the photoconductive drums. If something goes wrong with any one of these laser beam detection sensors, a problem occurs when forming images.

DETAILED DESCRIPTION

In general, according to one embodiment, an image forming apparatus includes, a plurality of image carriers; a laser exposure unit which has a plurality of laser units which emits a laser beam, and forms latent images on each of the image carriers by performing the main scanning and sub scanning on each of the image carriers, using the laser beam emitted from these laser units; and a processing unit which transfers the latent image which is formed on each of the image carriers, to the image forming medium. The laser exposure unit includes a plurality of laser beam detection sensors which detects a laser beam which is emitted from each of the laser units as the reference position of the main scanning with respect to each of the image carriers; a detection section which detects an abnormality of these laser beam detection sensors; a generation section which generates a signal of the laser beam detection sensor in which an abnormality is detected in the detection section, which corresponds to an output signal before detecting the abnormality, in a pseudo manner, on the basis of the output signal of the laser beam detection sensor in which the abnormality is not detected in the detection section; a laser controller which controls the laser unit which corresponds to the laser beam detection sensor in which the abnormality is not detected in the detection section, according to the output signal of the laser beam detection sensor in which the abnormality is not detected, and controls the laser unit which corresponds to the laser beam detection sensor in which the abnormality is not detected in the detection section, on the basis of the output signal of the generation section.

Hereinafter, one embodiment according to the invention will be described with reference to drawings.

Figure 1:
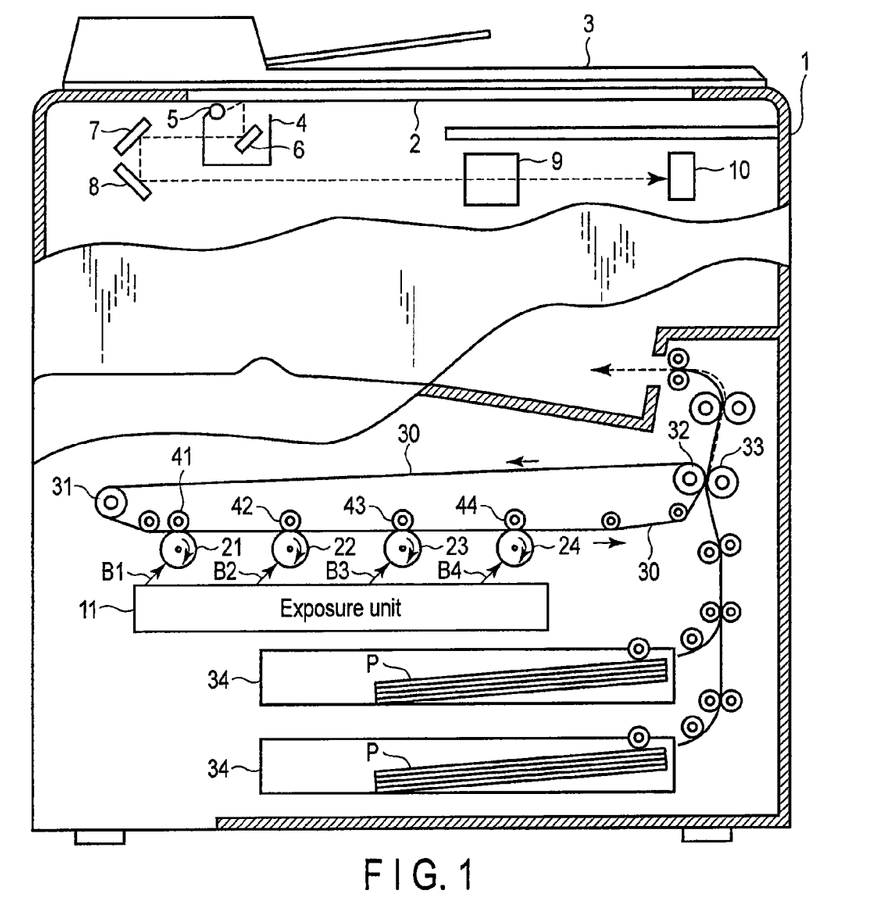
FIG. 1 is a diagram which shows an entire configuration of one embodiment.

As shown in FIG. 1, an original document table (a glass plate) 2 is arranged at the upper part of a main body of the apparatus 1. A cover 3 is arranged on the original document table 2. A carriage 4 is arranged at the lower side of the original document table 2, and an exposure lamp 5 is arranged at the carriage 4. The carriage 4 reciprocates along the lower surface of the original document table 2. The original document on the original document table 2 is exposed when the exposure lamp 5 is turned on, while the carriage 4 is reciprocating. The image on the original document is optically read due to the exposure. The read image is reflected on a CCD 10 through reflection mirrors 6, 7, and 8, and a lens block 9. The CCD 10 outputs an image signal which corresponds to the read image.

The image signal which is output from the CCD 10 is processed in an image processing section 85 which will be described later, and becomes yellow image data Dy, magenta image data Dm, cyan image data Dc, and black image data Dk. The image data is supplied to a laser exposure unit 11. The laser exposure unit 11 respectively exposes and scans a first photoconductive drum 21 for forming a yellow image, a second photoconductive drum 22 for forming a magenta image, a third photoconductive drum 23 for forming a cyan image, and a fourth photoconductive drum 24 for forming a black image, using a plurality of laser beams B1, B2, B3, and B4.

A transfer belt 30 is disposed at the first photoconductive drum 21, the second photoconductive drum 22, the third photoconductive drum 23, and the fourth photoconductive drum 24. The transfer belt 30 extends over a drive roller 31 and a driven roller 32, and rotates counterclockwise. The primary transfer rollers 41, 42, 43, and 44 are disposed at a position which faces the first photoconductive drum 21, the second photoconductive drum 22, the third photoconductive drum 23, and the fourth photoconductive drum 24. The primary transfer rollers 41, 42, 43, and 44 allow the transfer belt 30 to rotate while being in contact with the first photoconductive drum 21, the second photoconductive drum 22, the third photoconductive drum 23, and the fourth photoconductive drum 24, and transfer a visible image on the first photoconductive drum 21, the second photoconductive drum 22, the third photoconductive drum 23, and the fourth photoconductive drum 24, to the transfer belt 30. The secondary transfer roller 33 is disposed at a position which faces the driven roller 32 by interposing the transfer belt 30 therebetween.

Figure 2:
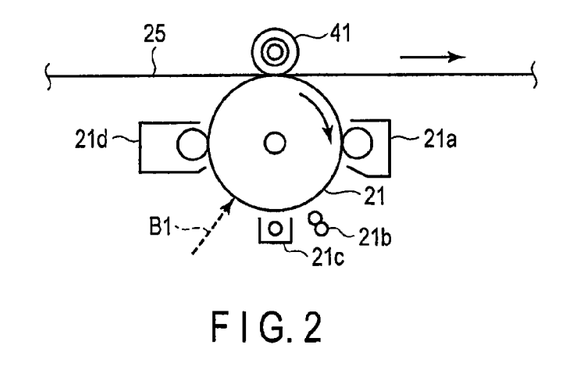
FIG. 2 is a diagram which shows one photoconductive drum and a configuration in the vicinity of the drum according to the embodiment.

FIG. 2 shows a configuration of the above-described first photoconductive drum 21 and the vicinity of the drum. A cleaner 21a, a neutralizing lamp 21b, a charging unit 21c, and a developing unit 21d are arranged in the vicinity of the first photoconductive drum 21. The cleaner 21a removes a developing material which remains on the surface of the first photoconductive drum 21. The above-described neutralizing lamp 21b removes a charge which remains on the surface of the first photoconductive drum 21. The charging unit 21c charges an electrostatic charge to the surface of the first photoconductive drum 21, by applying a high voltage to the first photoconductive drum 21. An electrostatic latent image is formed on the surface of the first photoconductive drum 21 when the surface of the first photoconductive drum 21, on which the charging is completed, is exposed and scanned using the laser exposure unit 11. The developing unit 21d develops the electrostatic latent image on the surface of the first photoconductive drum 21 in yellow, and visualizes the image by supplying yellow developing material (toner) to the surface of the first photoconductive drum 21.

The second photoconductive drum 22, the third photoconductive drum 23, and the fourth photoconductive drum 24, and the configuration of the vicinity thereof are the same as those of the first photoconductive drum 21, accordingly, the description thereof will be omitted.

A plurality of sheet feeding cassettes 34 is arranged on the lower side of the laser exposure unit 11. The paper sheet P which is an image forming medium in these sheet feeding cassettes 34 is sent and interposed between the transfer belt 30 and the secondary transfer roller 33. The secondary transfer roller 33 transfers the visible image, which is transferred to the transfer belt 30, to the paper sheet P.

Figure 3:
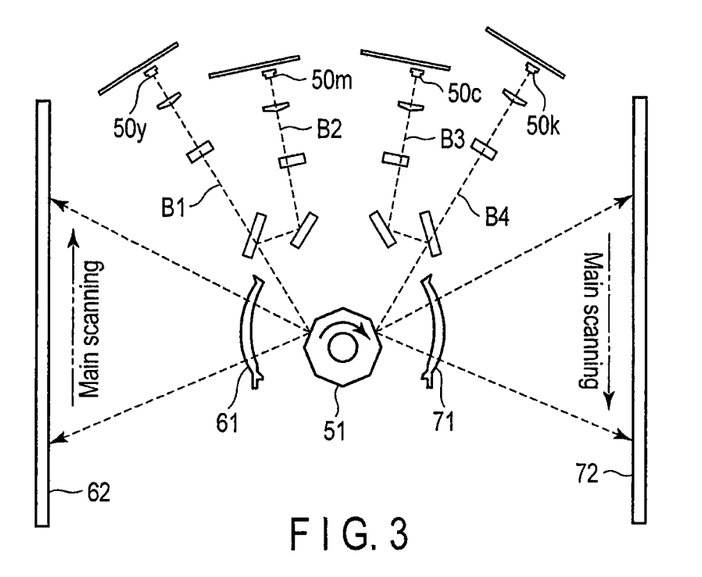
FIG. 3 is a top view of the main part of a laser exposure unit according to the embodiment.
Figure 4:
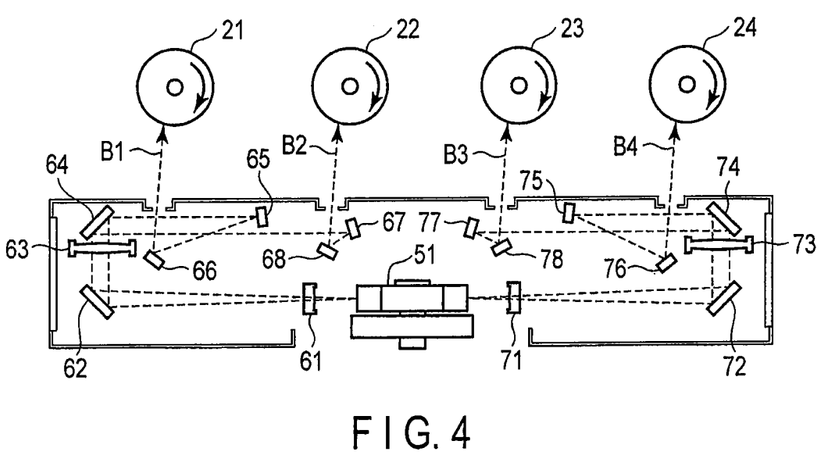
FIG. 4 is a side view of the main part of the laser exposure unit according to the embodiment.
Figure 5:
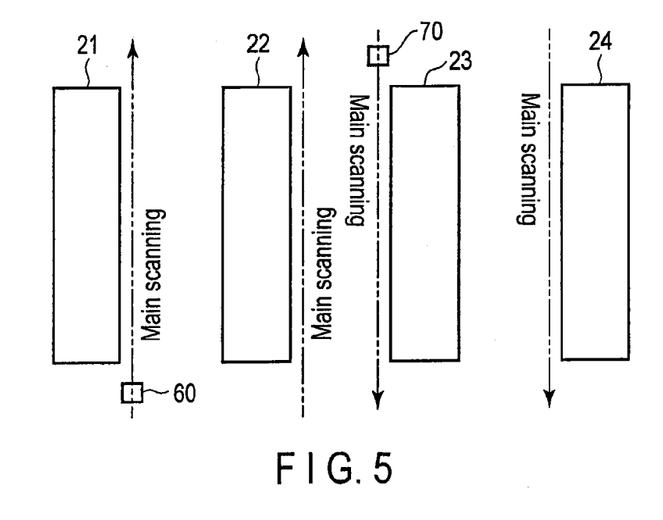
FIG. 5 is a top view of two of each laser beam detection sensor and each photoconductive drum of the laser exposure unit according to the embodiment.

The main part of the laser exposure unit 11 is shown in FIGS. 3, 4, and 5.

A rotation-type polygon mirror 51 is irradiated with the laser beam B1 which is emitted from the first laser unit 50y for forming a yellow image. The polygon mirror 51 has a plurality of reflective surfaces, receives the laser beam B1 from the first laser unit 50y in one reflective surface, and reflects in the horizontal direction, while rotating in the direction shown by the arrow. The first photoconductive drum 21 is irradiated with the reflected laser beam B1 which passed through an fθ1 lens 61, a reflective mirror 62, an fθ2 lens 63, and reflective mirrors 64, 65 and 66. Due to the irradiation of the laser beam B1, the first photoconductive drum 21 is subjected to the main scanning along the axis direction of the first photoconductive drum 21. The main scanning is repeated along with the rotation of the first photoconductive drum 21. This repetition of the main scanning becomes the sub-scanning. By using this main scanning and sub-scanning, the electrostatic latent image for the yellow image is formed on the first photoconductive drum 21.

The polygon mirror 51 is irradiated with the laser beam B2 which is emitted from the second laser unit 50m for forming a magenta image. The polygon mirror 51 receives the laser beam B2 from the second laser unit 50m from the same reflective surface as the reflective surface on which the laser beam B1 is reflected, and reflects in the horizontal direction. The second photoconductive drum 22 is irradiated with the reflected laser beam B2 which passed through the fθ1 lens 61, the reflective mirror 62, the fθ2 lens 63, the reflective mirror 64, and reflective mirrors 67 and 68. Due to the irradiation of the laser beam B2, the second photoconductive drum 22 is subjected to the main scanning along the axis direction of the second photoconductive drum 22. The main scanning is repeated along with the rotation of the second photoconductive drum 22. This repetition of the main scanning becomes the sub-scanning. By using this main scanning and sub-scanning, the electrostatic latent image for the magenta image is formed on the second photoconductive drum 22.

The first laser beam B1 irradiates the first laser beam detection sensor 60 placed just before photoconductor drum 21. Then the first photoconductor drum 21 is irradiated just after that. At this time, the first laser beam detection sensor 60 outputs a signal BD1. This signal BD1 is used as the reference position signal of the main scanning of the laser beam B1 with respect to the first photoconductive drum 21. In addition, the signal BD1 is used as the reference position signal of the main scanning of the laser beam B2 with respect to the second photoconductive drum 22 as well, on the basis of the detection result.

The polygon mirror 51 is irradiated with the laser beam B3 which is emitted from the third laser unit 50c for forming a cyan image. The polygon mirror 51 receives the laser beam B3 from the third laser unit 50c, from one reflective surface which is different from the reflective surface on which the laser beams B1 and B2 are reflected, and reflects in the horizontal direction. The third photoconductive drum 23 is irradiated with the reflected laser beam B3 which passed through an fθ1 lens 71, a reflective mirror 72, an fθ2 lens 73, and reflective mirrors 74, 75 and 76. Due to the irradiation of the laser beam B3, the third photoconductive drum 23 is subjected to the main scanning along the axis direction of the third photoconductive drum 23. The main scanning is repeated along with the rotation of the third photoconductive drum 23. This repetition of the main scanning becomes the sub-scanning. By using these main scanning and sub-scanning, the electrostatic latent image for the cyan image is formed on the third photoconductive drum 23.

The polygon mirror 51 is irradiated with the laser beam B4 which is emitted from the fourth laser unit 50k for forming a black image. The polygon mirror 51 receives the laser beam B4 from the fourth laser unit 50k from the same reflective surface as the reflective surface on which the laser beam B3 is reflected, and reflects in the horizontal direction. The fourth photoconductive drum 24 is irradiated with the reflected laser beam B4 which passed through the fθ1 lens 71, the reflective mirror 72, the fθ2 lens 73, and the reflective mirror 74, and reflective mirrors 77 and 78. Due to the irradiation of the laser beam B4, the fourth photoconductive drum 24 is subjected to the main scanning along the axis direction of the fourth photoconductive drum 24. The main scanning is repeated along with the rotation of the fourth photoconductive drum 24. This repetition of the main scanning becomes the sub-scanning. By using these main scanning and sub-scanning, the electrostatic latent image for the black image is formed on the fourth photoconductive drum 24.

The third laser beam B3 irradiates the second laser beam detection sensor 70 placed just before photoconductor drum 23. Then the first photoconductor drum 23 is irradiated just after that. At this time, the second laser beam detection sensor 70 outputs a signal BD2. This signal BD2 is used as the reference position signal of the main scanning of the laser beam B3 with respect to the third photoconductive drum 23. In addition, the signal BD2 is used as the reference position signal of the main scanning of the laser beam B4 with respect to the fourth photoconductive drum 24 as well, on the basis of the detection result.

Figure 6:
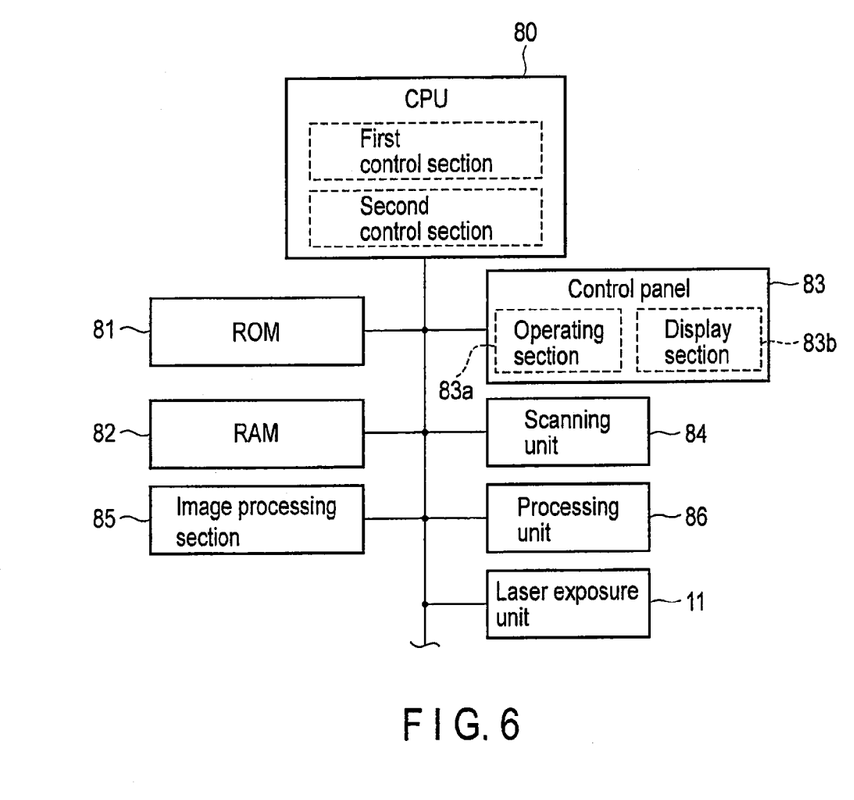
FIG. 6 is a block diagram which shows a control circuit according to the embodiment.

FIG. 6 shows a control circuit of the main body 1 of the apparatus.

A ROM 81, a RAM 82, a control panel 83, a scanning unit 84, an image processing section 85, a processing unit 86 and the laser exposure unit 11 are connected to a CPU 80.

The control panel 83 includes an operation section 83a which can be operated by a user, and a display section 83b for displaying data to the user. The scanning unit 84 includes the carriage 4, the exposure lamp 5, the reflective mirrors 6, 7, and 8, the lens block 9, the CCD 10 and the like, and optically reads the image on the original document. The image processing section 85 outputs yellow image data Dy, magenta image data Dm, cyan image data Dc, and black image data Dk, by processing the image which is read by the scanning unit 84. This output is supplied to the laser exposure unit 11.

The processing unit 86 includes the first photoconductive drum 21, the second photoconductive drum 22, the third photoconductive drum 23, the fourth photoconductive drum 24, a configuration in FIG. 2, the transfer belt 30, the driving roller 31, the driven roller 32, the secondary transfer roller 33, and the primary transfer rollers 41, 42, 43 and 44, or the like. Each of the latent images formed on the first photoconductive drum 21, the second photoconductive drum 22, the third photoconductive drum 23, and the fourth photoconductive drum 24, is developed, and the developed images are transferred (printed) to the paper sheet P.

Figure 7:
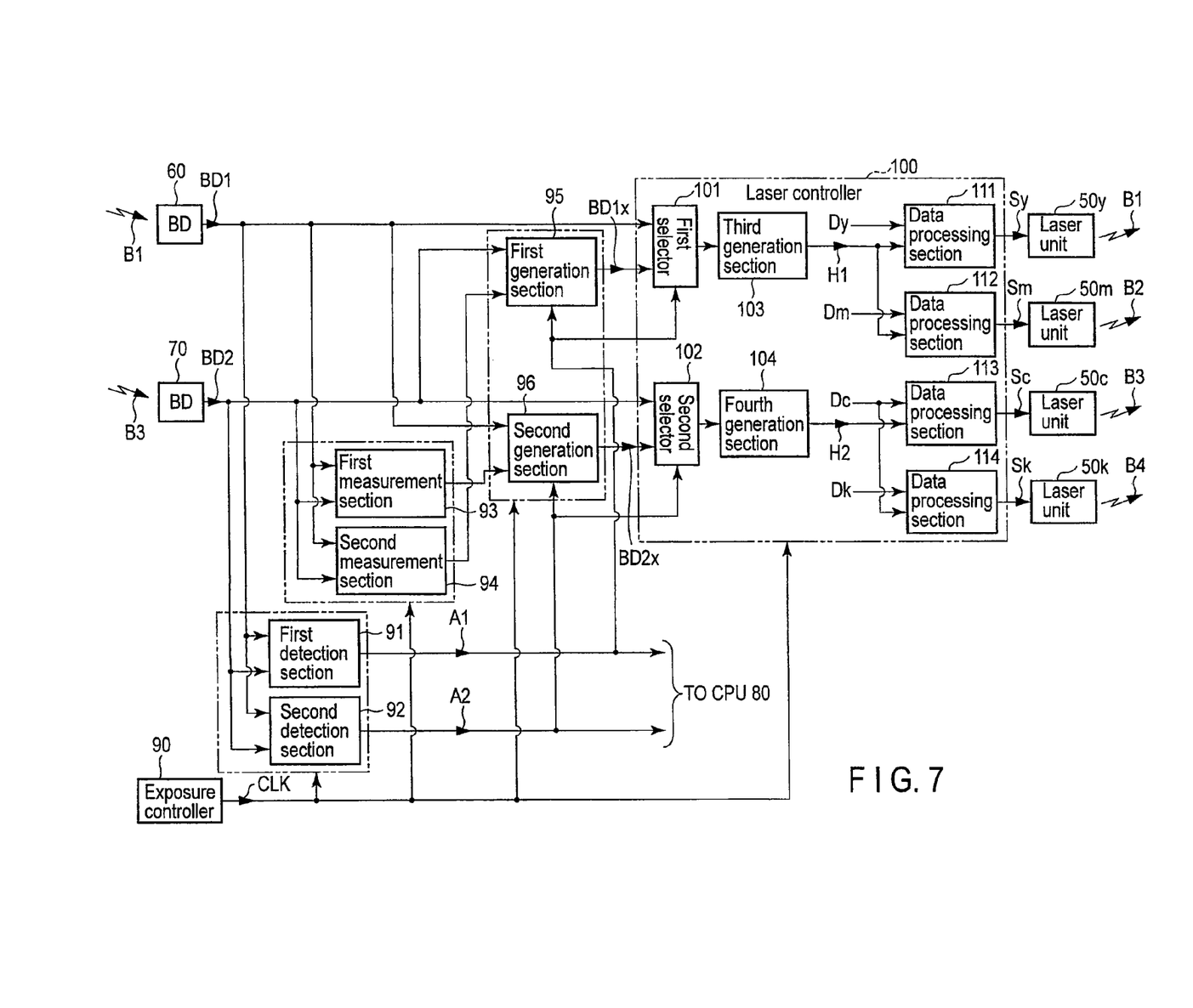
FIG. 7 is a block diagram which shows a control circuit of the laser exposure unit according to the embodiment.

The laser exposure unit 11 includes a control circuit shown in FIG. 7.

That is, the output signal BD 1 of the first laser beam detection sensor 60, is supplied to first and second detection sections 91 and 92, first and second measuring sections 93 and 94, a second generation section 96, and a laser controller 100. The output signal BD2 of the second laser beam detection sensor 70 is supplied to the first and second detection sections 91 and 92, the first and second measuring sections 93 and 94, the first generation sections 95, and the laser controller 100. The image clock signal CLK which is output from the exposure controller 90 is supplied to the first and second detection sections 91 and 92, the first and second measuring sections 93 and 94, the first and second generation sections 95 and 96, and the laser controller 100.

The first detection section 91 detects an abnormality of the first laser beam detection sensor 60, on the basis of the output signal BD1 of the first laser beam detection sensor 60. Specifically, it is determined that the first laser beam detection sensor 60 is abnormal when a level of the output signal BD1 of the first laser beam detection sensor 60 does not change over a certain period of time T0, or more, in which the period of time T0 is based on the image clock signal CLK. The second detection section 92 detects an abnormality of the second laser beam detection sensor 70, on the basis of the output signal BD2 of the second laser beam detection sensor 70. Specifically, it is determined that the second laser beam detection sensor 70 is abnormal when a level of the output signal BD2 of the second laser beam detection sensor 70 does not change over the certain period of time T0, or more, in which the period of time T0 is based on the image clock signal CLK.

Output signals A1 and A2 of the first and second detection sections 91 and 92 are supplied to the first and second generation sections 95 and 96, the laser controller 100, and the CPU 80. The output signal A1 becomes logic "1" when an abnormality is detected by the first detection section 91, and becomes logic "0" when the abnormality is not detected by the first detection section 91. The output signal A2 becomes logic "1" when an abnormality is detected by the second detection section 92, and becomes logic "0" when the abnormality is not detected by the second detection section 92.

The first measuring section 93 measures a time difference T1 from a detection timing of the first laser beam detection sensor 60 (=a level change of the output signal BD1) to a detection timing of the second laser beam detection sensor 70 (=a level change of the output signal BD2), on the basis of the image clock signal CLK. The measurement result of the first measuring section 93 (=the time difference T1) is supplied to the second generation section 96. The second measuring section 94 measures a time difference T2 from a detection timing of the second laser beam detection sensor 70 (=a level change of the output signal BD2) to a detection timing of the first laser beam detection sensor 60 (=a level change of the output signal BD1), on the basis of the image clock signal CLK. The measurement result of the second measuring section 94 (=the time difference T2) is supplied to the first generation section 95.

When an abnormality is detected in the first detection section 91, the first generation section 95 generates a signal BD1x which corresponds to the output signal BD1 of the first laser beam detection sensor 60 before detecting the abnormality, in a pseudo manner, on the basis of the output signal BD2 of the second laser beam detection sensor 70, the measurement result of the second measuring section 94 (=the time difference T2) and the image clock signal CLK. The generated signal BD1x is supplied to the laser controller 100. When an abnormality is detected in the second detection section 92, the second generation section 96 generates a signal BD2x which corresponds to the output signal BD2 of the second laser beam detection sensor 70 before detecting the abnormality, in a pseudo manner, on the basis of the output signal BD1 of the first laser beam detection sensor 60, the measurement result of the first measuring section 93 (=the time difference T1) and the image clock signal CLK. The generated signal BD2x is supplied to the laser controller 100.

The laser controller 100 controls the first and second laser units 50y and 50m which correspond to the first laser beam detection sensor 60 according to the BD 1 of the first laser beam detection sensor 60, when the first detection section 91 does not detect an abnormality of the first laser beam detection sensor 60 (the output signal A1 has the logic "0"). The laser controller 100 controls the third and fourth laser units 50c and 50k which correspond to the second laser beam detection sensor 70 according to the BD2 of the second laser beam detection sensor 70, when the second detection section 92 does not detect an abnormality of the second laser beam detection sensor 70 (the output signal A2 has the logic "0"). In addition, when the first detection section 91 detects the abnormality of the first laser beam detection sensor 60 (the output signal A1 has the logic "1"), and when the second detection section 92 does not detect the abnormality of the second laser beam detection sensor 70 (the output signal A2 has the logic "0"), the laser controller 100 controls the first and second laser units 50y and 50m which correspond to the first laser beam detection sensor 60 are controlled according to the signal BD1x of the first generation section 95. The laser controller 100 controls the third and fourth laser units 50c and 50k which correspond to the second laser beam detection sensor 70 according to the output signal BD2x of the second generation section 96, when the second detection section 92 detects the abnormality of the second laser beam detection sensor 70 (the output signal A2 has the logic "1"), and the first detection section 91 does not detect the abnormality of the first laser beam detection sensor 60 (the output signal A1 has the logic "0").

Specifically, the laser controller 100 includes first and second selectors 101 and 102, third and fourth generation sections 103 and 104, and first, second, third, and fourth data processing sections 111, 112, 113, and 114.

The first selector 101 selectively outputs the output signal BD1 of the first laser beam detection sensor 60 when the output signal A1 has the logic "0", and selectively outputs the output signal BD1x of the first generation section 95 when the output signal A1 has the logic "1". The selective output of the first selector 101 is supplied to the third generation section 103. The second selector 102 selectively outputs the output signal BD2 of the second laser beam detection sensor 70 when the output signal A2 has the logic "0", and selectively outputs the output signal BD2x of the second generation section 96 when the output signal A2 has the logic "1". The selective output of the second selector 102 is supplied to the fourth generation section 104.

The third generation section 103 outputs the main scanning reference signal (also referred to as a horizontal synchronization signal) H1 which is in synchronization with the signal BD1 which is selectively output in the first selector 101, or the signal BD1x. The main scanning reference signal H1 is supplied to the first and second data processing sections 111 and 112. The fourth generation section 104 outputs the main scanning reference signal (also referred to as the horizontal synchronization signal) H2 which is in synchronization with the signal BD2 which is selectively output in the second selector 102, or the signal BD2x. The main scanning reference signal H2 is supplied to the third and fourth data processing sections 113 and 114.

The first data processing section 111 converts the yellow image data Dy which is supplied from the image processing section 85, to a serial data signal Sy which has a pulse width corresponding to a concentration which is expressed by the yellow image data Dy, and a frequency corresponding to the image clock signal CLK which is supplied from the exposure controller 90, and outputs the serial data signal Sy at predetermined timing which corresponds to the main scanning reference signal H1. The output is supplied to the first laser unit 50y. The first laser unit 50y emits a laser beam B1 which corresponds to the serial data signal Sy while the serial data signal Sy is supplied, and emits a laser beam B1 with a constant intensity, while the serial data signal Sy is not supplied.

The second data processing section 112 converts the magenta image data Dm which is supplied from the image processing section 85, to a serial data signal Sm which has a pulse width corresponding to a concentration which is expressed by the magenta image data Dm, and a frequency corresponding to the image clock signal CLK which is supplied from the exposure controller 90, and outputs the serial data signal Sm at predetermined timing which corresponds to the main scanning reference signal H1. The output is supplied to a laser unit 50m. The laser unit 50m emits a laser beam B2 which corresponds to the serial data signal Sm, while the serial data signal Sm is supplied, and emits a laser beam B2 with a constant intensity, while the serial data signal Sm is not supplied.

The third data processing section 113 converts the cyan image data Dc which is supplied from the image processing section 85, to a serial data signal Sc which has a pulse width corresponding to a concentration which is expressed by the cyan image data Dc, and a frequency corresponding to the image clock signal CLK which is supplied from the exposure controller 90, and outputs the serial data signal Sc at predetermined timing which corresponds to the main scanning reference signal H2. The output is supplied to a laser unit 50c. The laser unit 50c emits a laser beam B3 which corresponds to the serial data signal Sc, while the serial data signal Sc is supplied, and emits a laser beam B3 with a constant intensity, while the serial data signal Sc is not supplied.

The fourth data processing section 114 converts the black image data Dk which is supplied from the image processing section 85, to a serial data signal Sk which has a pulse width corresponding to a concentration which is expressed by the black image data Dk, and a frequency corresponding to the image clock signal CLK which is supplied from the exposure controller 90, and outputs the serial data signal Sk at predetermined timing which corresponds to the main scanning reference signal H2. The output is supplied to a laser unit 50k. The laser unit 50k emits a laser beam B4 which corresponds to the serial data signal Sk, while the serial data signal Sk is supplied, and emits a laser beam B4 with a constant intensity, while the serial data signal Sk is not supplied.

Meanwhile, the CPU 80 includes the following first and second control sections, as the main functions.

(1) A first control section that, when any one of the first and second detection sections 91 and 92 detects an abnormality, informs the fact using a display of a display section 83b of a control panel 83.

(2) A second control section that, when both the first and second detection sections 91 and 92 detect the abnormality, informs the fact using the display of the display section 83b of the control panel 83, and stops an operation of the scanning unit 84, the image processing section 85, the processing unit 86, and the laser exposure unit 11.

Herein below, the operations will be described.

Figure 8:
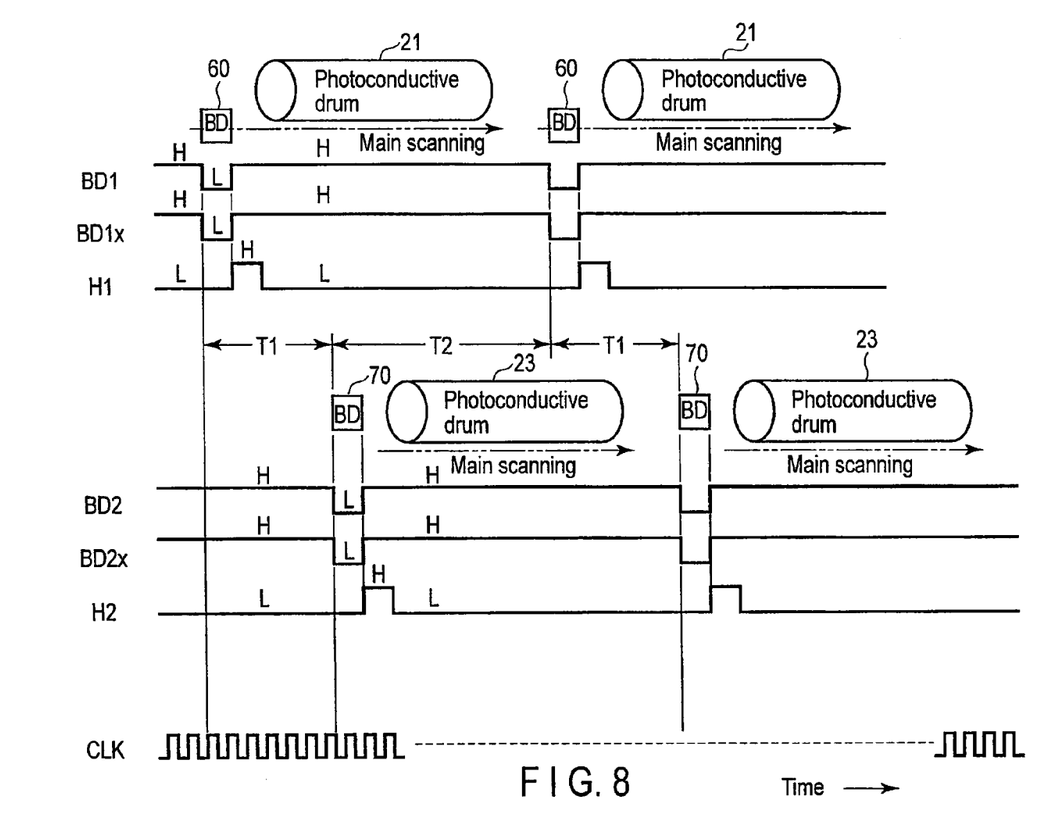
FIG. 8 is a time chart which shows an operation of a first laser beam detection sensor and a second laser beam detection sensor, when they are normal according to the embodiment.

The time chart in FIG. 8 shows a normal operation of the first and second laser beam detection sensors 60 and 70. When the first and second laser beam detection sensor 60 and 70 are irradiated with the laser beams B1 and B2, the output signal BD1 and BD2 of the first and second laser beam detection sensors 60 and 70 fall from a high level "H" to a low level "L". The laser controller 100 generates the main scanning reference signal H1 which is in synchronization with the output signal BD1, and controls the first and second laser units 50y and 50m, according to the main scanning reference signal H1. Further, the laser controller 100 generates the main scanning reference signal H2 which is in synchronization with the output signal BD2, and controls the third and fourth laser units 50c and 50k, according to the main scanning reference signal H2.

Figure 9:
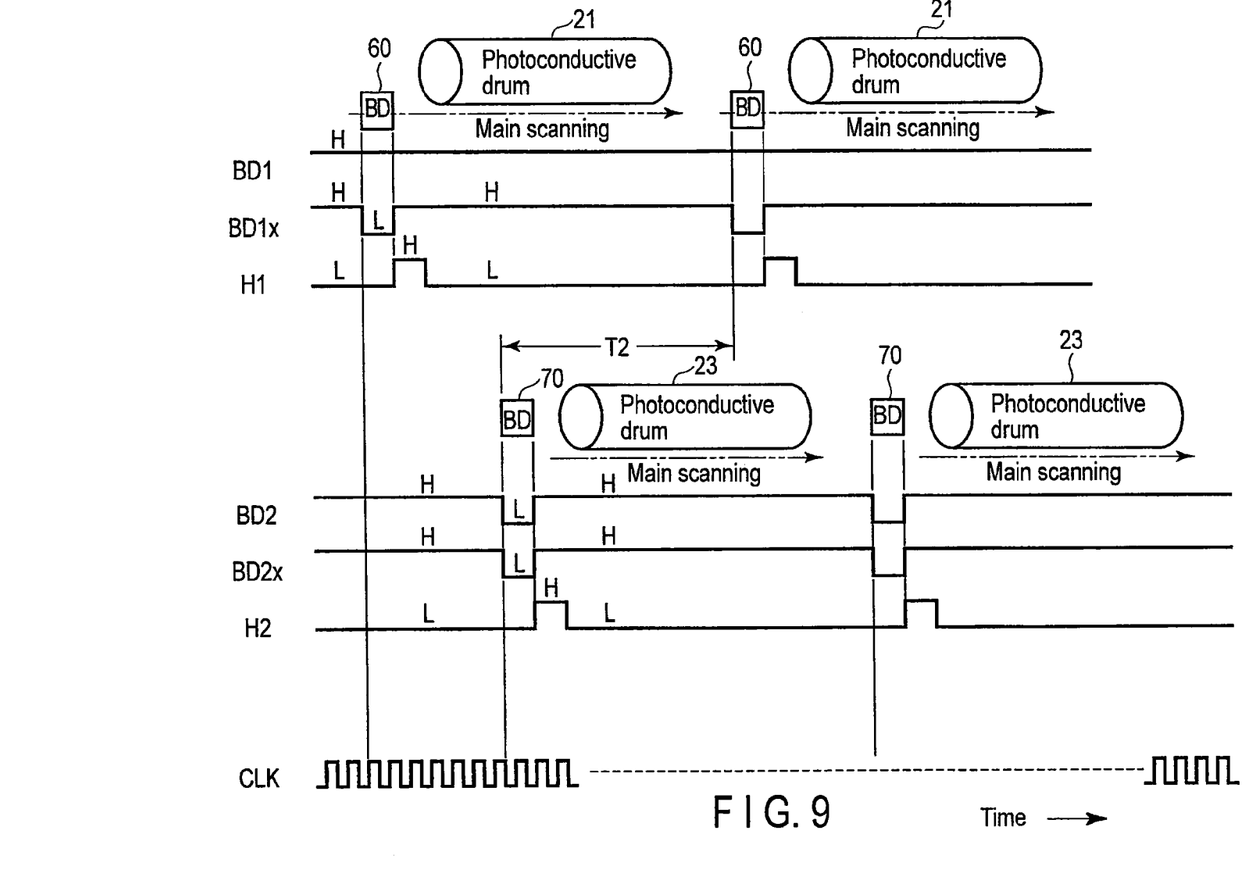
FIG. 9 is a time chart which shows an operation of the first laser beam detection sensor, when it is abnormal according to the embodiment.

The time chart in FIG. 9 shows an operation when the first laser beam detection sensor 60 is abnormal, and the second laser beam detection sensor 70 is normal. Even if the laser beam B1 is emitted to the first laser beam detection sensor 60, the output signal BD1 of the first laser beam detection sensor 60 does not change from the high level "H". When the laser beam B2 is emitted to the second laser beam detection sensor 70, the output signal BD2 of the second laser beam detection sensor 70 falls from the high level "H" to the low level "L". The laser controller 100 generates the signal BD1x which corresponds to the output signal BD1 of the first laser beam detection sensor 60 before the generation of the abnormality in a pseudo manner, on the basis of the output signal BD2 of the second laser beam detection sensor 70, and the measurement result of the second measurement section 94 (=the time difference T2). In addition, the laser controller 100 generates the main scanning reference signal H1 which is in synchronization with the generated output signal BD1x, and controls the first and second laser units 50y and 50m, according to the main scanning reference signal H1. Further, the laser controller 100 generates the main scanning reference signal H2 which is in synchronization with the generated output signal BD2, and controls the third and fourth laser units 50c and 50k, according to the main scanning reference signal H2.

In this manner, even if the abnormality occurs in the first laser beam detection sensor 60, it is possible to continue the image formation. The CPU 80 displays the fact that the first laser beam detection sensor 60 is abnormal, using the display section 83b of the control panel 83. When seeing this display, the user can request servicing of the first laser beam detection sensor 60.

Figure 10:
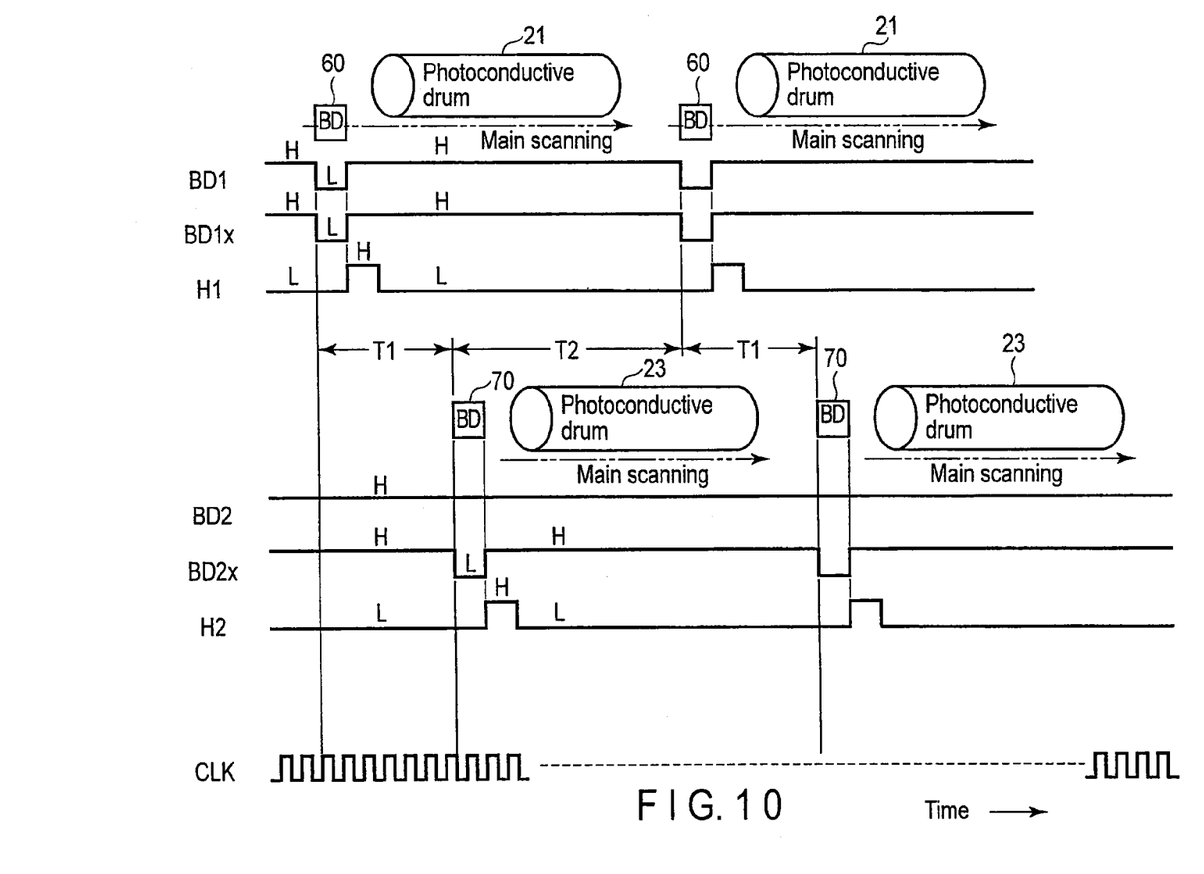
FIG. 10 is a time chart which shows an operation of the second laser beam detection sensor, when it is abnormal according to the embodiment.

The time chart in FIG. 10 shows an operation when the first laser beam detection sensor 60 is normal, and the second laser beam detection sensor 70 is abnormal. The output signal BD1 of the first laser beam detection sensor 60 falls from the high level "H" to the low level "L", when the laser beam B1 is emitted to the first laser beam detection sensor 60. Even if the second laser beam detection sensor 70 is irradiated with the laser beam B2, the output signal BD2 of the second laser beam detection sensor 70 maintains the high level "H" as is. The laser controller 100 generates the main scanning reference signal H1 which is in synchronization with the output signal BD1, and controls the first and second laser units 50y and 50m according to the main scanning reference signal H1. Further, the laser controller 100 generates a signal BD2x which corresponds to the output signal BD2 of the second laser beam detection sensor 70 before the generation of the abnormality, in a pseudo manner, on the basis of the output signal BD1 of the first laser beam detection sensor 60 and the measurement result of the first measuring section 93 (=the time difference T1). In addition, the laser controller 100 generates the main scanning reference signal H2 which is in synchronization with the generated output signal BD2x, and controls the third and fourth laser units 50c and 50k according to the main scanning reference signal H2.

In this manner, it is possible to continue the image formation even if the abnormality occurs in the second laser beam detection sensor 70. The CPU 80 displays the fact that the second laser beam detection sensor 70 is abnormal on the display section 83b of the control panel 83. When seeing this display, the user can ask a repair service of the second laser beam detection sensor 70.

When both the first laser beam detection sensor 60 and the second laser beam detection sensor 70 are abnormal, the CPU 80 can display the fact on the display section 83b of the control panel 83, and stops the operation of the scanning unit 84, the image processing unit 85, the processing unit 86, and the laser exposure unit 11. When seeing this display, the user can ask the repair service of the first laser beam detection sensor 60 and the second laser beam detection sensor 70.

In addition, in the embodiment, the time differences T1 and T2 were measured using the image clock CLK as it is, however, the time differences T1 and T2 may be measured by generating a signal of a higher frequency than that of the image clock signal CLK, and using the generated signal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
a plurality of image carriers;
a laser exposure unit which includes a plurality of laser units, each of which emits a laser beam, the laser exposure unit forming a latent image on each of the image carriers by performing main scanning and sub-scanning on each of the image carriers with the laser beams emitted from the laser units; and
a processing unit which transfers the latent image formed on each of the image carriers to a medium,
wherein the laser exposure unit further includes:
a plurality of laser beam detection sensors, each of which detects, as a reference position of the main scanning, one of the laser beams emitted from the laser units;
a measurement section which measures a difference in detection timings of the laser beam detection sensors;
a detection section configured to detect an abnormality in one or more of the laser beam detection sensors;
a generation section which generates, when an abnormality is detected in one of the laser beam detection sensors, a signal corresponding to an output signal of the laser beam detection sensors in which the abnormality is detected, based on the output signal of the laser beam detection sensors in which an abnormality is not detected and the measured difference; and
a laser controller which controls the laser unit corresponding to the laser beam detection sensor in which an abnormality is not detected by the detection section, based on the output signal of the laser beam detection sensor in which an abnormality is not detected, and which controls the laser unit corresponding to the laser beam detection sensor in which an abnormality is detected by the detection section, based on the signal generated by the generation section.

2. The apparatus of claim 1,
wherein the detection section detects an abnormality in each of the laser beam detection sensors based on output signal of each of the laser beam detection sensors.

3. The apparatus of claim 1,
wherein the laser exposure unit includes a rotating polygon mirror, and performs the main scanning and sub-scanning on each of the image carriers by reflecting the laser beams emitted from each of the laser units off the rotating polygon mirror.

4. The apparatus of claim 1, further comprising:
a control panel which includes an operation section and display section; and
a control section which controls the display section to display that an abnormality is detected by the detection section when the abnormality is detected.

5. The apparatus of claim 1,
wherein the plurality of image carriers are a plurality of photoconductive drums.

6. An image forming apparatus comprising:
a plurality of photoconductive drums;
a laser exposure unit which includes a plurality of laser units each of which emits a laser beam, the laser exposure unit forming a latent image on each of the image carriers by performing main scanning and sub-scanning on each of the photoconductive drums with the laser beams emitted from the laser units; and
a processing unit which transfers the latent image formed on each of the photoconductive drums to a medium, wherein the laser exposure unit further includes:
a first and second laser beam detection sensors, each of which detects, as a reference position of the main scanning, one of the laser beams emitted from the laser units;
a first detection section configured to detect an abnormality in the first laser beam detection sensor;
a second detection section configured to detect an abnormality in the second laser beam detection sensor;
a first generation section which generates, when the abnormality is detected in the first detection section, a signal corresponding to the output signal of the first laser beam detection sensor, based on the output signal of the second laser beam detection sensor;
a second generation section which generates, when the abnormality is detected in the second detection section, a signal corresponding to the output signal of the second laser beam detection sensor, based on the output signal of the first laser beam detection sensor; and
a laser controller which controls the laser unit corresponding to the first laser beam detection sensor according to the output signal of the first laser beam detection sensor when an abnormality in the first laser beam detection sensor is not detected by the first detection section; controls the laser unit corresponding to the second laser beam detection sensor according to the output signal of the same second laser beam detection sensor when abnormality in the second laser beam detection sensor is not detected by the second detection section; controls the laser unit corresponding to the first laser beam detection sensor according to the output signal of the first generation section when an abnormality in the first laser beam detection sensor is detected by the first detection section and when an abnormality in the second laser beam detection sensor is not detected by the second detection section; and controls the laser unit corresponding to the second laser beam detection sensor according to the output signal of the second generation section, when an abnormality in the second laser beam detection sensor is detected by the second detection section and an abnormality in the first laser beam detection sensor is not detected by the first detection section.

7. The apparatus of claim 6, further comprising:
a first measurement section which measures a time difference between a detection timing of the first laser beam detection sensor and a detection timing of the second laser beam detection sensor; and
a second measurement section which measures a time difference between a detection timing of the second laser beam detection sensor and a detection timing of the first laser beam detection sensor.

8. The apparatus of claim 7,
wherein the first generation section generates, when an abnormality is detected in the first detection section, a signal corresponding to the output signal of the first laser beam detection sensor, based on an output signal of the second laser beam detection sensor and the measurement result of the second measurement section; and
wherein the second generation section generates, when an abnormality is detected in the second detection section, a signal corresponding to the output signal of the second laser beam detection sensor, based on an output signal of the first laser beam detection sensor and the measurement result of the first measurement section.

9. The apparatus of claim 6,
wherein the first and second detection sections detect the abnormality of the first and second laser beam detection sensors, based on output signals of the first and second laser beam detection sensors.

10. The apparatus of claim 6,
wherein the laser exposure unit includes a rotating polygon mirror, performs the main scanning on each of the photoconductive drums along the axis direction of each of the photoconductive drum by reflecting the laser beams emitted from each of the laser units off the the rotating polygon mirror, and performs the sub-scanning by repeatedly performing the main scanning as each of the photoconductive drums are rotated.

11. The apparatus of claim 6, further comprising:
a control panel which includes an operation section and display section; and
a control section which controls the display section to display that an abnormality is detected by the detection section when the abnormality is detected by any one of the first and second detection sensors.

12. The apparatus of claim 6,
wherein the plurality of photoconductive drums include a first photoconductive drum for forming yellow images, a second photoconductive drum for forming magenta images, a third photoconductive drum for forming cyan images, and a fourth photoconductive drum for forming black images,
wherein the plurality of laser units include a first laser unit for forming yellow images, a second laser unit for forming magenta images, a third laser unit for forming cyan images, and a fourth laser unit for forming black images,
wherein the first laser beam detection sensor detects a laser beam which is emitted from the first laser unit as the reference position of the main scanning with respect to the first photoconductive drum, and
wherein the second laser beam detection sensor detects a laser beam which is emitted from the third laser unit as the reference position of the main scanning with respect to the third photoconductive drum.

13. The apparatus of claim 12,
wherein the laser controller controls the first and second laser units corresponding to the first laser beam detection sensor according to the output signal of the first laser beam detection sensor when an abnormality in the first laser beam detection sensor is not detected by the first detection section; controls the third and fourth laser units corresponding to the second laser beam detection sensor according to the output signal of the second laser beam detection sensor when an abnormality in the second laser beam detection sensor is not detected by the second detection section; controls the first and second laser units corresponding to the first laser beam detection sensor, according to the output signal of the first generation section when an abnormality in the first laser beam detection sensor is detected by the first detection section and when an abnormality in the second laser beam detection sensor is not detected by the second detection section; and controls the third and fourth laser units corresponding to the second laser beam detection sensor according to the output signal of the second generation section when an abnormality in the second laser beam detection sensor is detected by the second detection section and an abnormality in the first laser beam detection sensor is not detected by the first detection section.

14. The apparatus of claim 12,
wherein the laser exposure unit includes a rotating polygon mirror, performs the main scanning on the first, second, third, and fourth photoconductive drums, along the axis direction of the first, second, third, and fourth photoconductive drums by reflecting the laser beams emitted from the first, second, third and fourth laser units off the rotating polygon mirror towards the first, second, third and fourth photoconductive drums, respectively, and performs the sub-scanning by repeatedly performing the main scanning as the first, second, third, and fourth photoconductive drums are rotated.

15. The apparatus of claim 14,
wherein the polygon mirror has a plurality of reflective surfaces, and reflects a laser beam emitted from the first and second laser units toward the first and second photoconductive drums using one surface of each of the reflective surfaces, and reflects a laser beam emitted from the third and fourth laser units, toward the third and fourth photoconductive drums using a different surface of each of the reflective surfaces.

16. A controlling method of an image forming apparatus including:
a plurality of image carriers;
a laser exposure unit which includes a plurality of laser units each of which emits a laser beam, the laser exposure unit forming a latent image on each of the image carriers by performing main scanning and sub-scanning on each of the image carriers with the laser beams emitted from the laser units, and a plurality of laser beam detection sensors, each of which detects one of the laser beams emitted from each of the laser units as the reference position of the main scanning with respect to each of the image carriers; and
a processing unit which transfers the latent image formed on each of the photoconductive drums to a medium to be formed with images,
the method comprising:
detecting an abnormality in at least one of the laser beam detection sensors;
generating a signal corresponding to the output signal of the laser beam detection sensor in which the abnormality is detected, based on the output signal of the laser beam detection sensor in which an abnormality is not detected; and
controlling the laser unit corresponding to the laser beam detection sensor in which the abnormality is detected according to the generated signal, and the laser unit corresponding to the laser beam detection sensor in which the abnormality is not detected according to the output signal of the laser beam detection sensor in which the abnormality is not detected.

* * * * *